United States Patent [19]

Kato

[11] Patent Number: 5,072,323
[45] Date of Patent: Dec. 10, 1991

[54] MAGNETIC HEAD WITHOUT AN ERASURE GAP FOR RECORDING NEW SIGNALS OVER OLD DATA

[75] Inventor: Minoru Kato, Chichibu, Japan

[73] Assignee: Canon Denshi Kabushiki Kaisha, Chichibu, Japan

[21] Appl. No.: 451,741

[22] Filed: Dec. 18, 1989

[30] Foreign Application Priority Data

Dec. 23, 1988 [JP] Japan ............................... 63-326522

[51] Int. Cl.⁵ .............................................. G11B 5/23
[52] U.S. Cl. ................................................... 360/119
[58] Field of Search ........................ 360/119, 120, 126

[56] References Cited

U.S. PATENT DOCUMENTS

| | | | |
|---|---|---|---|
| 3,502,821 | 3/1970 | Duinker | 360/119 |
| 4,408,240 | 10/1983 | Pastore | 360/119 |
| 4,847,715 | 7/1989 | Kumasaka et al. | 360/119 |

FOREIGN PATENT DOCUMENTS 3806171 9/1989 Fed. Rep. of Germany .
59613 3/1986 Japan .

Primary Examiner—Robert S. Tupper
Attorney, Agent, or Firm—Spencer & Frank

[57] ABSTRACT

In a magnetic head in which first and second core halves are disposed on the entry and leaving sides of a magnetic recording medium, respectively, one of the first and second core halves is provided with a first edge for limiting a data track width and second edges which are disposed on both sides of the first edge and are inclined by a first angle with respect to the first edge. The other core half is provided with a third edge which is opposed to the first edge and is equal in length to the first edge. The other core half is also provided with fourth edges disposed on both sides of the third edge and inclined by a second angle with respect to the third edge. The data recording is made in the magnetic field between the first and third edges. Furthermore, the recording is made on both sides of the data track by the magnetic fields between the second and fourth edges so that erasure of old data can still occur despite deviation of the positions of the new and old data tracks. On both sides, data which has an azimuth with respect to the data recorded on the data track is not reproduced and there is no adverse effect.

5 Claims, 6 Drawing Sheets

MAGNETIC HEAD WITHOUT AN ERASURE GAP FOR RECORDING NEW SIGNALS OVER OLD DATA

BACKGROUND OF THE INVENTION

1. Field of the Invention

The present invention relates to a magnetic head and more particularly to a magnetic head of the type in which a core half on the side of a recording medium incoming side and a core half on the side of a recording medium outgoing side are disposed in opposing relation through a magnetic gap which is used for magnetic recording.

2. Description of the Prior Art

The data packaging density of magnetic recordings has recently been remarkably increased. As a result video tape recorders (VTRs) using magnetic tape 8 mm in width and digital audio tape recorders (DATs) or the like have been developed, along with the development of magnetic heads and recording media which have high data packaging density.

There are known flexible disk drives (FDDs) which use flexible magnetic recording media (flexible disks), as the magnetic recording apparatuses capable of attaining a high data packaging density. In the FDDs, it is known to increase the data packaging density by a method which increases not only the line recording density but also the track density. Table 1 shows the maximum line recording density, the track density and the track pitch of FDDs which use flexible disks having capacities (unformatted) of 1 megabyte (MB), 2 MB, MB, 12.5 MB and 16 MB.

TABLE 1

|  | Line recording density | track density | track pitch |
|---|---|---|---|
| 1 MB | 8.7 KBPI | 135 TPI | 187.5 μm |
| 2 MB | 17.4 | 135 | 187.5 |
| 4 MB | 34.9 | 135 | 187.5 |
| 12.5 MB | 36.0 | 406 | 62.5 |
| 16 MB | 35.0 | 540 | 47.0 |

In Table 1, KBPI represents the number of kilobytes per inch and TPI represents the number of tracks per inch.

As is clear from Table 1, the increase in line recording density and track density greatly increases the recording capacity of FDDs.

FIG. 1 is a view used to explain a recording system employing a magnetic head used in an FDD with a capacity ranging from 1 to 2 MB, a data track being projected upon the contact surface with a recording medium of the magnetic head. This system is called the tunnel erasure system. As shown in FIG. 1, after the recording in a recording-reproducing gap or R/W gap 1, both sides of the recorded loci are erased by two erasing heads so that the track 3 on which data are recorded remains. Here, the recording medium moves in the direction indicated by the arrow 4.

Even when the size of the R/W gap 1 varies and the position of the track deviates, both side bands are erased by the two erasing gaps 2 so that data on both side bands is positively erased. Therefore this method is used in FDDs (mainly 1 MB–2 MB) with a track density on the order of 200 TPI.

However, in the case of FDDs with capacities ranging from 12.5 MB to 16 MB and a high track density ranging from 406 TPI to 540 TPI, as shown in FIG. 2, after positioning of the head by previously recorded servo signals 5a and 5b, the data is read out from or written in the track 3 by the R/W gap. That is, the head is located at the position at which the reproduced outputs of the servo signals 5a and 5b coincide.

Because the position of the head relative to the track is determined in response to the servo signals 5a and 5b and the track pitch becomes narrower, in general, the FDDs do not use the magnetic head of the tunnel erasing method shown in FIG. 1, but use a magnetic head with only an R/W gap.

However, even when a magnetic head having only an R/W gap as shown in FIG. 2 is used, errors sometimes occur in the width of the track and the deviation of the position of the head relative to the servo signals 5a and 5b. In this case, as shown in FIG. 3, when new data is recorded on the track 3 on which data has been already recorded, if deviation 7 of the position of the track occurs and a track 6 on which new data has been recorded by the R/W gap 1 is formed, the old data 8 which has not been erased remains.

Especially, in the case of FDDs, the recording medium is not fixed to the apparatus. And in many cases the recording medium on which the data has been recorded and read out are used by other FDDs. That is, so-called interchangeability is needed. However, when the data which has not been erased remains, the remaining data is also read out together with the readout of the newly recorded data so that errors are contained in the reproduced data. Especially, in the case of FDDs, the error rate in the data processing is strictly limited from 10-9 to 10-12. Therefore the data which has not been completely erased becomes a very serious problem.

SUMMARY OF THE INVENTION

In view of the above, one of the objects of the present invention is to solve the above-described problems.

Another object of the present invention is to provide a magnetic head which is not equipped with an erasing magnetic gap and which can prevent the old data which has not been erased from remaining when new signals are recorded.

A further object of the present invention is to provide a magnetic head which can prevent the old signal which was not erased from remaining and which can be fabricated in a simple manner.

In the first aspect of the present invention, a magnetic head comprises;

a first core half disposed on the entry side of a magnetic recording medium; and a second core half disposed on the leaving side of the magnetic recording medium in opposing relationship with the first core half through a magnetic gap. A sliding surface of one of the first and second core halves upon which the magnetic recording medium slides is defined by a first edge which limits the data track width on the magnetic recording medium at a portion thereof opposing the other core half. Second edges are disposed on both sides of the first edge and are inclined by 10° or above with respect to the first edge, and a sliding surface of the other core half upon which the magnetic recording medium slides is defined by a third edge at a portion thereof opposing the one core half and equal in length to the first edge. Fourth edges are disposed on both sides of the third edge, the fourth edges being opposed to the second edges and inclined at angles between 10° and 45° with respect to the second edge.

Here, the third and fourth edges may be in colinear relationship with respect to each other.

The sliding surface of the other core half may be further defined by fifth edges disposed on respective outer sides of the fourth edges and inclined at angles greater than 45° with respect to the second edges.

Opposing surfaces and the portions adjacent thereto of the first and second core halves may be formed by a magnetic alloy having a high saturation magnetic flux density. The magnetic alloy is deposited by a thin film forming technique.

In the second aspect of the present invention, a magnetic head comprises;

a first core half disposed on the entry side of a magnetic recording medium; and a second core half disposed on the leaving side of the magnetic recording medium in opposing relationship with the first core half through a magnetic gap. A sliding surface of one of the first and second core halves upon which the magnetic recording medium slides is defined by a first edge which limits the data track width on the magnetic recording medium at a portion thereof opposing the other core half. Second edges are disposed on both sides of the first edge and are inclined by a first predetermined angle with respect to the first edge, and a sliding surface of the other core half upon which the magnetic recording medium slides is defined by a third edge at a portion thereof opposing the one core half and equal in length to the first edge. Fourth edges are disposed on both sides of the third edge, the fourth edges being opposed to the second edges and inclined by a second predetermined angle with respect to the second edge. Fifth edges are disposed on respective outer sides of the fourth edges, the fifth edges being opposed to the second edges and inclined by a third predetermined angle greater than the second predetermined angle.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
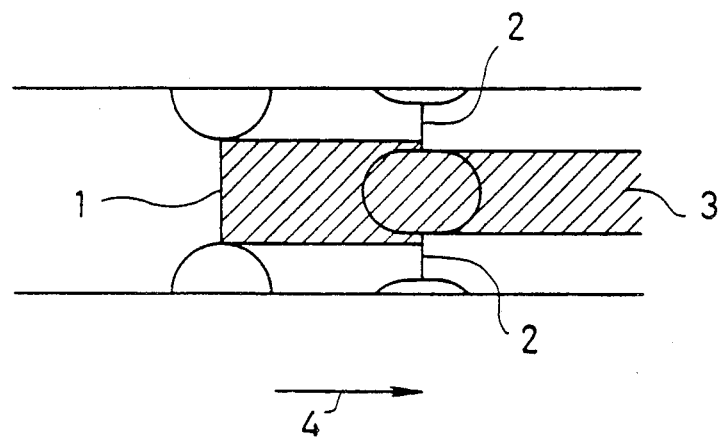
FIG. 1 is a top view illustrating on an enlarged scale the gap portion of a conventional magnetic head.
Figure 2:
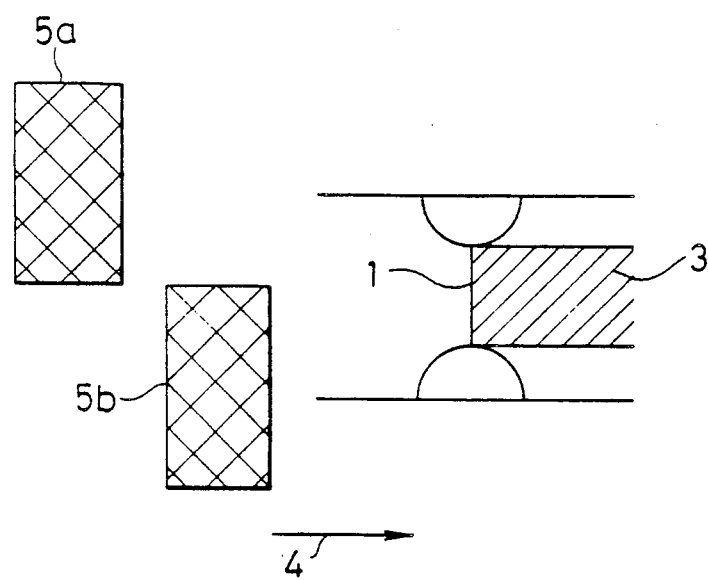
FIG. 2 is a top view used to explain another conventional magnetic head.
Figure 3:
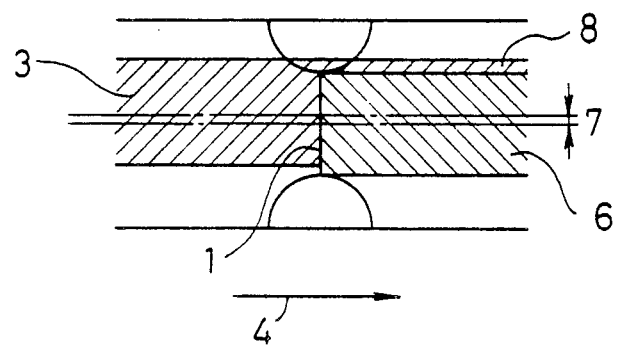
FIG. 3 is a top view used to explain the problems of the magnetic head shown in FIG. 2.
Figure 4:
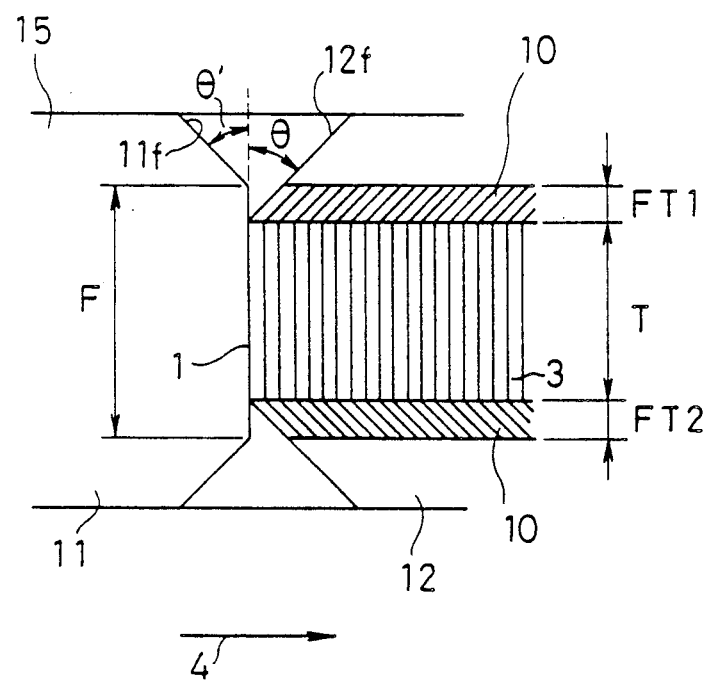
FIGS. 4 and 5 are views used to explain the fundamental principle of the embodiments of the present invention.
Figure 5:
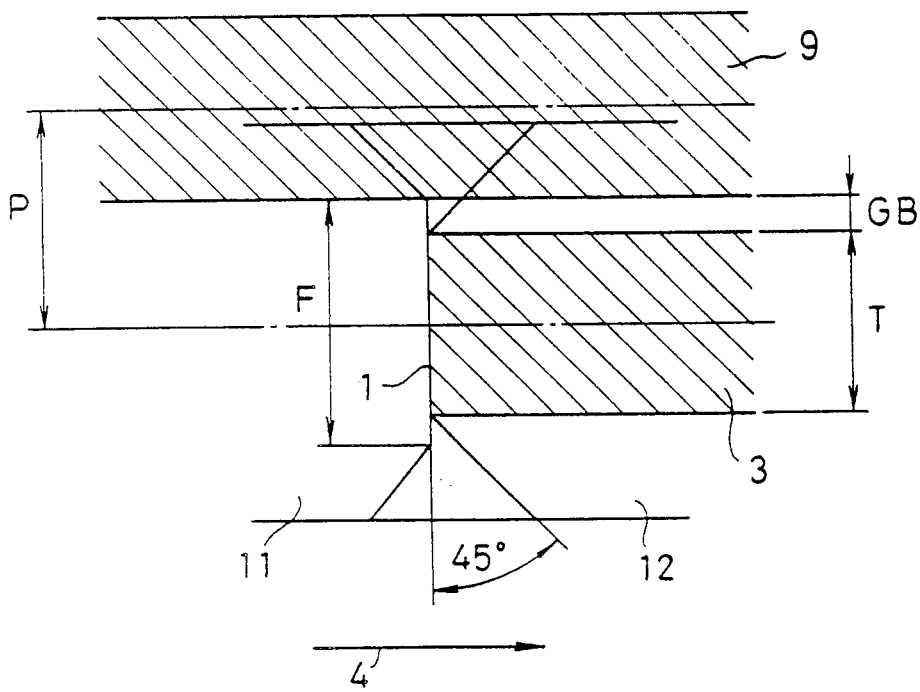

Referring first to FIGS. 4 and 5, the fundamental principle of a first, a second and a third embodiment will be described. In FIG. 4, a track of a recording medium is projected upon the contact surface of a recording head 15 in contact with the recording medium. The recording head 15 has core halves 11 and 12 which are in opposing relationship with each other through a single read/write (R/W) gap. A core half (a first core half) 11 which is disposed on the incoming or entering side of the recording head 15 in the direction of advancement 4 of a flexible disk-shaped recording medium (to be referred to hereinafter in the specification as "a flexible disk") has a flat surface whose width F is greater than that of a predetermined track width T and which is in opposing relationship with the gap 1. The flat surface forms a linear edge (a third edge) on the contact surface. Another core half (a second core) 12 on the outgoing or leaving side has a flat surface whose width is equal to the track width T and which is in opposing relationship with the gap 1. The flat surface of the core half 12 forms a linear edge (a first edge) on the contact surface. A surface 11f extended beyond the width F of the core half 11 and a surface 12f extended beyond the width F of the core half 12 are inclined at predetermined angles Θ' and Θ, respectively, with respect to their main surfaces having the widths F and T, respectively. The surface 11f forms a fourth edge, and the surface 12f forms a second edge. Thus the magnetic head 15 has the magnetic gap 1 equal to the track width T.

When the magnetic head 15 is used in recording or writing, tracks 10 are formed on both sides of the track 3 having width T along the incline of the contact surface of the core half 12 because of the fringe magnetic field. The sum of the width of the fringe tracks 10 and the width T of the track 3 is equal to the width F of the core half 11 on the incoming or entering side of the recording head 15. As shown in FIG. 5, a fringe track 10 is formed in a guard band GB between the data track 3 and the adjacent track 9 spaced apart from the track 3 by a track pitch P. In the fringe tracks 10, the data is recorded at a different angle with respect to the angle at which the data is recorded on the data track 3, so that even when the recording head 15 deviates during the reproduction mode, no information is read out from the fringe tracks 10.

The widths FT1 and FT2 of the fringe tracks 10 are determined by the track width F of the core half 11 on the incoming or entering side. In order to prevent the fringe track 10 from influencing the adjacent data 9, the width FT1 of the fringe track 10 is about one half of the guard band width GB. It is therefore preferable that the track width F of the core half 11 on the incoming or entering side be made coincident with a predetermined track pitch P. That is, the sum of the widths of the fringe tracks of the adjacent tracks is made coincident with the guard band GB. Therefore in the embodiments of the present invention, the track pitch P, the track width F of the core half 11 on the incoming or entering side, and the sum of the track width T on the outgoing or leaving side and the widths FT1 and FT2 of the fringe tracks are made coincident with each other; that is, $P = F = T + FT1 + FT2$.

First Embodiment

Figure 6:
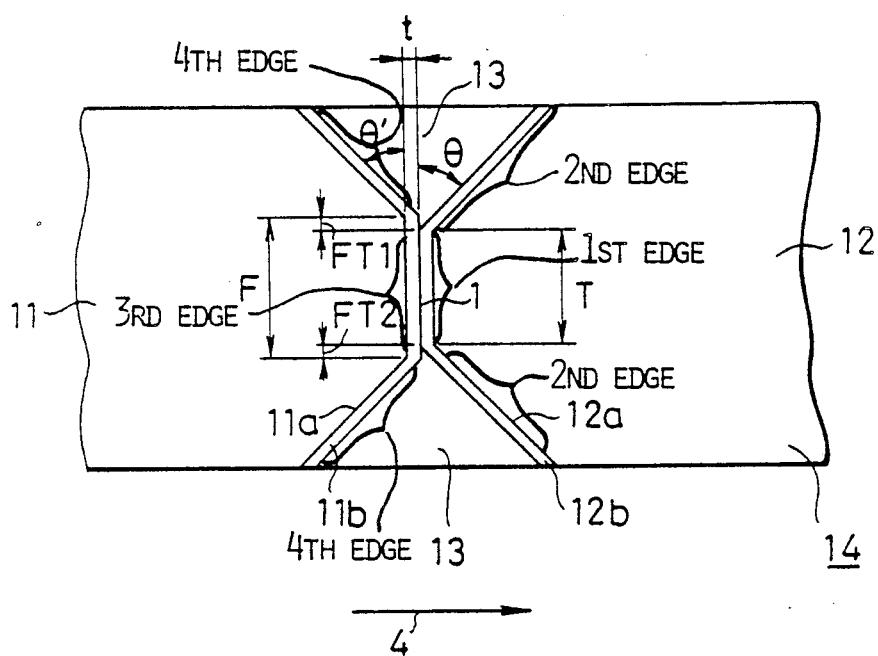
FIG. 6 is a view illustrating on an enlarged scale a gap portion of a magnetic head according to a first embodiment of the present invention.
Figure 7:
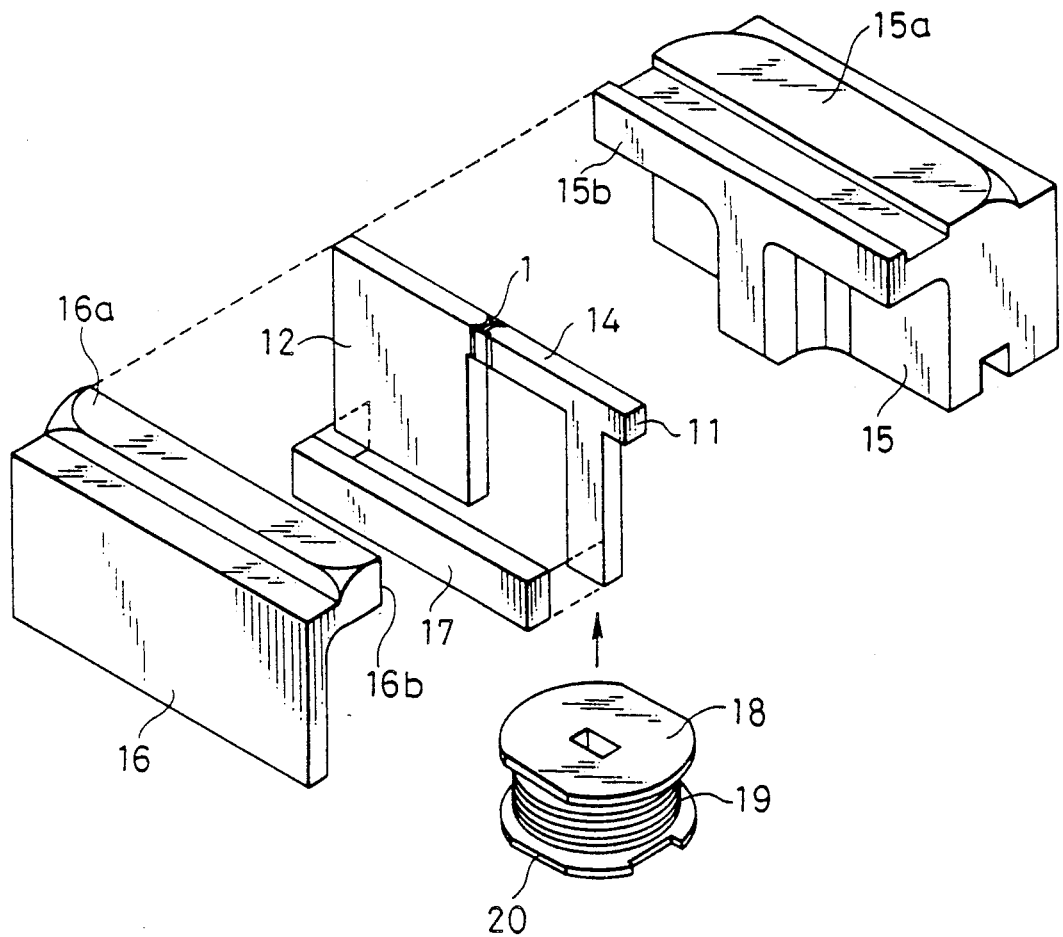
FIG. 7 is an exploded perspective view of the first embodiment.
Figure 8:
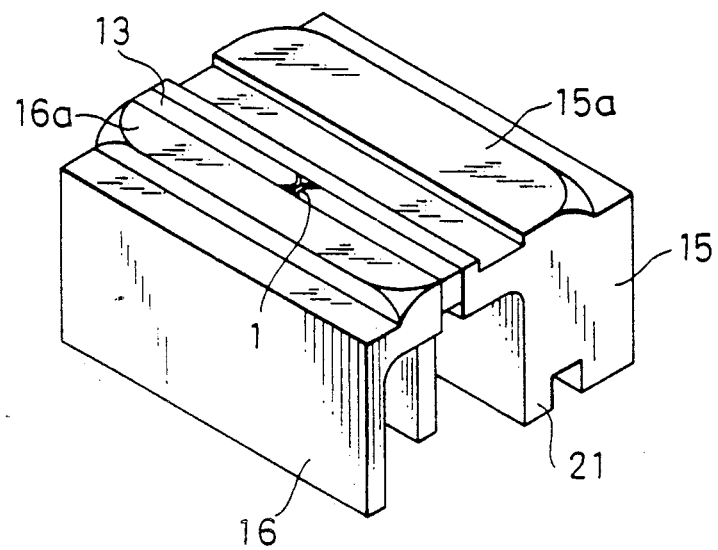
FIG. 8 is a perspective view of the magnetic head of the first embodiment.

Referring now to FIGS. 6-8, a first embodiment of the present invention will be described. The first embodiment is a magnetic head with a high capacity recording medium using a metal, a barium ferrite or the like which has a line recording density ranging from 35 to 36 KBPI, a high degree of coercive force and a high degree of residual magnetic flux density (Br). FIG. 6 illustrates on an enlarged scale the gap portion of the first embodiment. The core half 11 on the incoming or entering side and the core half 12 on the outgoing or leaving side are disposed in opposing relationship with each other, thereby constructing an R/W core assembly.

In the case of the fabrication of the R/W core assembly, a pair of blocks for the core halves made of a material having a high degree of permeability (for instance, Mn-Zn series ferrites) are suitably machined. That is, as described above, on a block for the core half 11 on the incoming or entering side, a track groove 11a formed therein defines a surface which has a width F equal to the track pitch P and which is in opposing relationship with the gap. The groove 11a further defines each of adjacent surfaces having a predetermined angle $\Theta'$ inclined relative to the surface opposing the gap. The adjacent surfaces form fourth edges, and the opposing surface forms a third edge. On another block for the core half 12 on the outgoing or leaving side, a track groove 12a formed therein defines a surface which is in opposing relationship with the gap and has a predetermined track width T. Groove 12a further defines each of adjacent surfaces having a predetermined angle $\Theta$ ($\Theta$ being 45° in the first embodiment) inclined relative to the surface opposing the gap for producing the fringe magnetic field. The opposing surface forms a first edge, and the adjacent surfaces form second edges.

Next, a material having a high degree of saturation magnetic flux density 11b and 12b (for instance, a Fe-Al-Si alloy) is deposited in the grooves 11a and 12a so as to have a predetermined thickness t by a conventional thin film deposition technique such as sputtering (t being 7-10 μm in the first embodiment). The deposited thin films are made into opposing relationship with a nonmagnetic material such as $SiO_2$ which defines the R/W gap. Thereafter the core halves are joined together with glass, thereby fabricating an R/W core assembly 14.

Next, as shown in FIGS. 7 and 8, the R/W core assembly 14 is clamped between the joint surfaces 15b and 16b of sliders 15 and 16 each having a medium sliding surface 15a (16a) so as to permit the smooth sliding movement of the medium. Thereafter they are joined by an adhesive, glass or the like 13, whereby the head element 21 is fabricated.

Next a coil assembly 20 consisting of a bobbin 18 around which is wound a coil 19 is inserted into the medium incoming or entering side core half 11 of the R/W coil assembly 14, and the core half 11 on the medium incoming or entering side and the core half 12 on the medium outgoing of leaving side are magnetically coupled with each other by a back core 17 for establishing a magnetic circuit, whereby the magnetic head is assembled.

The first embodiment with the above-described construction is capable of saturation recording in a satisfactory manner on a medium such as a metal medium having a coercive force ranging from 1300 to 1500 Oersted (Oe) and a high data packaging density. Furthermore it can satisfactorily form the fringe tracks 10 which are essential for FDDs having a high data packaging density and a high capacity.

Second Embodiment

Figure 9:
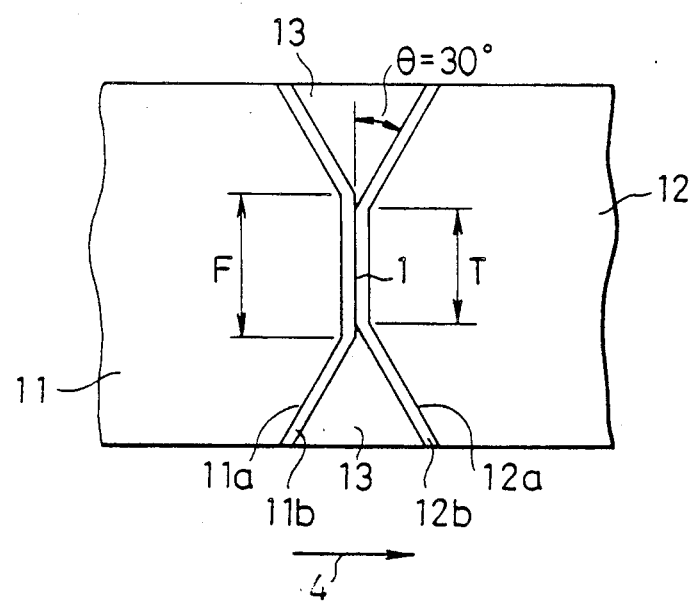
FIG. 9 is a view illustrating on an enlarged scale the gap portion of a magnetic head according to a second embodiment of the present invention.

Referring next to FIG. 9, the second embodiment of the present invention will be described hereinafter. In the second embodiment, the angle $\Theta$ defined by the track grooves 11a and 12a as shown in the first embodiment is made 30°.

The second embodiment is adapted to use with a medium such as a metal medium having a high degree of coercive force and a high data-packaging density because of the following reason. In the case of media of the type just described above, unless the strong fringe magnetic field is produced, the unerased information cannot be re-written. More particularly, the angle $\Theta$ of the groove 12a relative to the gap opposing surface of the core half 12 on the outgoing or leaving side is selected to be less than or equal to 30° so that information can be re-written without leaving the unerased information.

Third Embodiment

Figure 10:
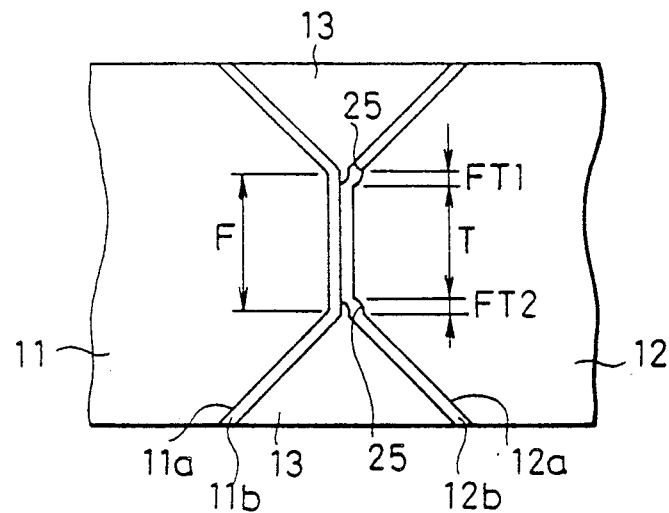
FIG. 10 illustrates on an enlarged scale the gap portion of a magnetic head according to a third embodiment of the present invention.

Next referring to FIG. 10, a third embodiment of the present invention will be described. In the case of forming the track grooves 11a and 12a by the incoming or entering side core half 11 and outgoing or leaving core half 12, the width of the opposing surfaces of the track grooves 11a and 12a are made equal to F and furthermore the corners of the outgoing or leaving core half 12 are etched by a few micrometers so that the width of the surface of the outgoing or leaving side core half 12 in opposing relationship to the incoming or entering side core half 11 becomes equal to the track width T. Thus the etched recesses 25 are formed.

In the case of the third embodiment, it becomes possible to form the first grooves 11a and 12a simultaneous with the fabrication of the incoming or entering core half 11 and the outgoing or leaving core half 12 and to control the fringe magnetic field by the degree of etching of the etched recesses 25.

So far only the corners of the outgoing or leaving side core half 12 have been described as being etched. However, the corners of both the incoming or entering side core half 11 and the outgoing or leaving side core half 12 may be etched to define the etched recesses 25 depending upon the relationship between the etched quantity and the resulting fringe magnetic field.

Fourth Embodiment

In the above-described embodiments, the width of the surface in opposing relationship to the magnetic gap of the incoming or entering core half 11 is made equal to F while the width of the surface in opposing relationship with the magnetic gap of the outgoing or leaving core half 12 is made equal to T, so that machining of the head element to determine the data track width T and the fringe track widths FT1 and FT2 becomes very simple.

Figure 11:
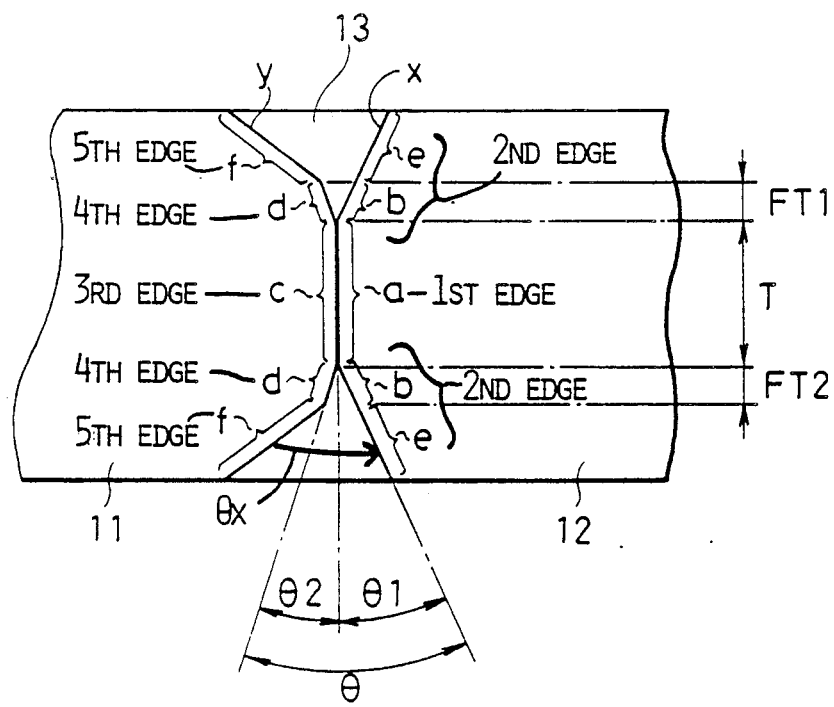
FIG. 11 is a view used to explain a magnetic head according to a fourth embodiment of the present invention.

Referring to FIG. 11, the construction of a magnetic head capable of attaining the objects of the present invention without taking the easy machining described above into consideration will be described.

FIG. 11 illustrates a view of the gaps and their adjacent portions of a general head in accordance with the present invention when viewed from a medium sliding surface. Same reference numerals are used to designate similar parts in both FIGS. 4 and 11.

First, in order to define a data track with a predetermined width T, the side x of the medium sliding surface of the outgoing or leaving core half 12 must be provided with a portion a (a first edge) in order to limit the data track width T. Furthermore on both sides of the portion a, there must be provided portions b (second edges) which are inclined by $\Theta 1$ relative to the portion a so that the azimuth loss becomes satisfactorily greater. The reason is that the direction of magnetization on the magnetic recording medium is determined by the edges of the medium sliding surface of the outgoing or leaving core half 12. As is well known to those skilled in the art, in the case of data recording with a frequency of a few MHz, a track width on the order of tens of micrometers and an azimuth angle of 10° or above, it is considered that because of the azimuth loss, the data recorded on the adjacent tracks are not reproduced. That is, the angle $\Theta 1$ is made 10° or greater ($\Theta \geq 10°$).

Next the side y of the opposing surface on the side of the medium sliding surface of the incoming or entering core half 11 is provided with a portion c (a third edge) therealong so that the data must be satisfactorily recorded. Furthermore on the side y portions d (fourth edges) are disposed in opposing relation to the portions b. The portions d cooperate with the portions b for generating the fringe field. As described above, the angle $\Theta$ (a second predetermined angle) defined by the portion b and the portion d is less than or equal to an angle capable of producing the fringe magnetic field (for instance, 45°). The angle $\Theta_x$, defined by a portion e extended outwardly from the portion b of the side x and a portion f (a fifth edge) extended outwardly from the portion d of the line y, is in excess of 45°. In this manner the fringe track widths FT1 and FT2 are defined.

In the first, second and third embodiments described above, for the sake of facilitating the fabrication, the portion c and the portions d are defined as colinear and the angle $\Theta 2$ shown in FIG. 11 is made equal to zero. In these cases, $\Theta 1 = \Theta$ and is not greater than 45°. From the standpoint of fabrication, it is impossible to make $\Theta 2$ negative. Therefore the objects of the present invention can be attained when $\Theta 1$ is 10° or above and $\Theta$ is in the range from 10° to 45°.

With the above-described construction, data is recorded by the magnetic field between the portion a of the outgoing or leaving core half and the portion c of the incoming or entering side core half and both sides of the data recorded track, the recording is made by the magnetic field between the b portions of the outgoing or leaving side core half and the portion d of the incoming or entering side core half. The recording of the data by the magnetic field between the portion b and the portion d has the azimuth of 10° or above relative to the data recorded on the recording track so that in the case of readout, the former data is not reproduced. Furthermore, even when a new recording track is more or less deviated from the old track in the case of recording, the unerased old track does not remain.

As is apparent from the explanation made with reference to FIG. 11, the present invention is not limited to the above-described embodiments and various modifications may be effected without leaving the true spirit of the present invention.

In the above embodiments, it has been described that the first core half disposed on the incoming or entering side is provided with the third, fourth and fifth edges while the second core half disposed on the outgoing or leaving side is provided with the first and second edges, but it is to be understood that the first core half may have the first and second edges while the second core half may have the third, fourth and fifth edges.

As described above, the magnetic head in accordance with the present invention need not be provided with an erasing head and a magnetic gap for erasing the recorded data. Furthermore in case of recording a new signal, an old signal is prevented from being left unerased. Thus the magnetic head in accordance with the present invention is very advantageous when the data is recorded especially at a high track density.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic head comprising:
    a first core half including a first sliding surface upon which slides a magnetic medium having a data track thereon, said first core half being disposed on one of the entry and leaving sides of said magnetic recording medium; and
    a second core half including a second sliding surface upon which slides said magnetic recording medium, said second core half being disposed on the other of said entry and leaving sides of said magnetic recording medium in opposing relationship with said first core half, a magnetic gap being interposed between said first and second core halves;
    wherein said second sliding surface comprises
        a first edge having a length corresponding to the width of the data track on said magnetic recording medium; and
        second edges extending from both sides of said first edge, said second edges each being inclined at an angle between 10° and 45° with respect to said first edge; and
    wherein said first sliding surface comprises
        a third edge parallel to said first edge, said third edge having a length which is greater than that of said first edge; and
        fourth edges disposed on both sides of said third edge, said fourth edges being opposed to said second edges and inclined at more than 45° with respect to said second edge.

2. A magnetic head as set forth in claim 1, wherein opposing surfaces and the portions adjacent thereto of said first and second core halves are formed of a magnetic alloy having a relatively high saturation magnetic flux density, said magnetic alloy being deposited by a thin film forming technique.

3. A magnetic head as set forth in claim 1, wherein the length of said third edge corresponds to a pitch of tracks formed in parallel on said magnetic recording medium.

4. A magnetic head comprising:
    a first core half including a first sliding surface upon which slides a magnetic medium having a data track thereon, said first core half being disposed on one of the entry and leaving sides of said magnetic recording medium; and a second core half including a second sliding surface upon which slides said magnetic recording medium, said second core half being disposed on the other of said entry and leaving sides of said magnetic recording medium in opposing relationship with said first core half, a magnetic gap being interposed between said first and second core halves;

wherein said second sliding surface comprises
- a first edge having a length corresponding to the width of the data track on said magnetic recording medium; and
- second edges extending from both sides of said first edge; and wherein said first sliding surface comprises
- a third edge parallel to said first edge, said third edge having a length which is equal to that of said first edge;
- fourth edges disposed on both sides of said third edge, said fourth edges being opposed to respective second edges and inclined at an angle between 10° and 45° with respect to said respective second edges, and
- fifth edges disposed on respective outer sides of said fourth edges, said fifth edges being opposed to respective second edges and inclined at more than 45° with respect to said respective second edges.

5. A magnetic head as set forth in claim 4, wherein said second edges are inclined at at least 10° with respect to said first edge.

* * * * *